July 29, 1947.　　　M. J. U. COETZEE　　　2,424,742
ROTARY PLANTER
Filed July 22, 1944　　　2 Sheets-Sheet 1
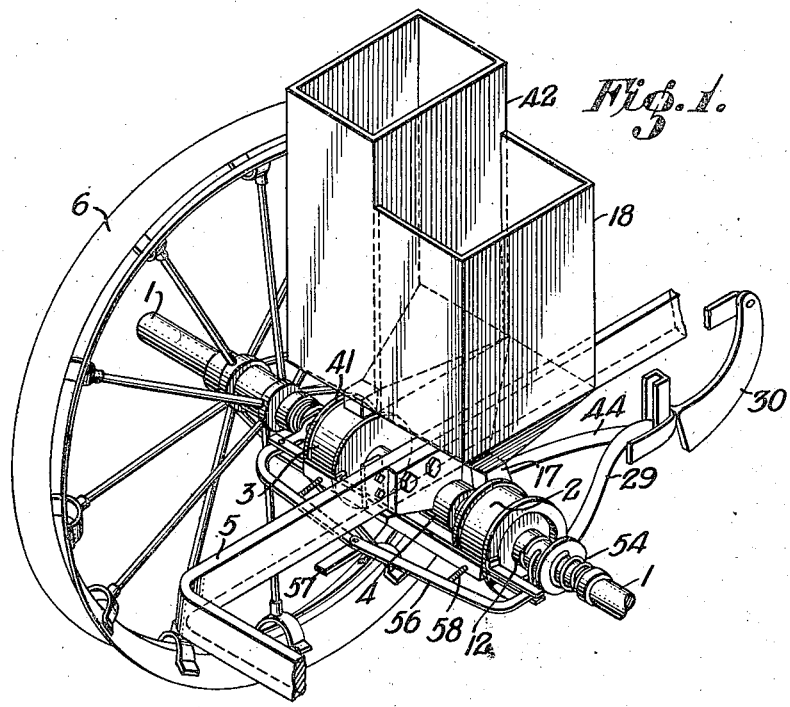
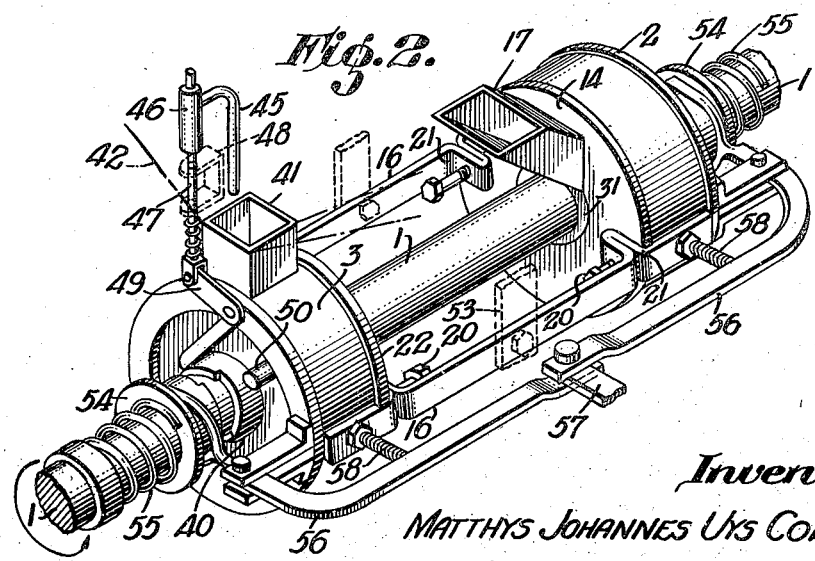
Inventor:
MATTHYS JOHANNES UYS COETZEE,
by Singer, Ehlert, Stern & Carlberg
Attorneys

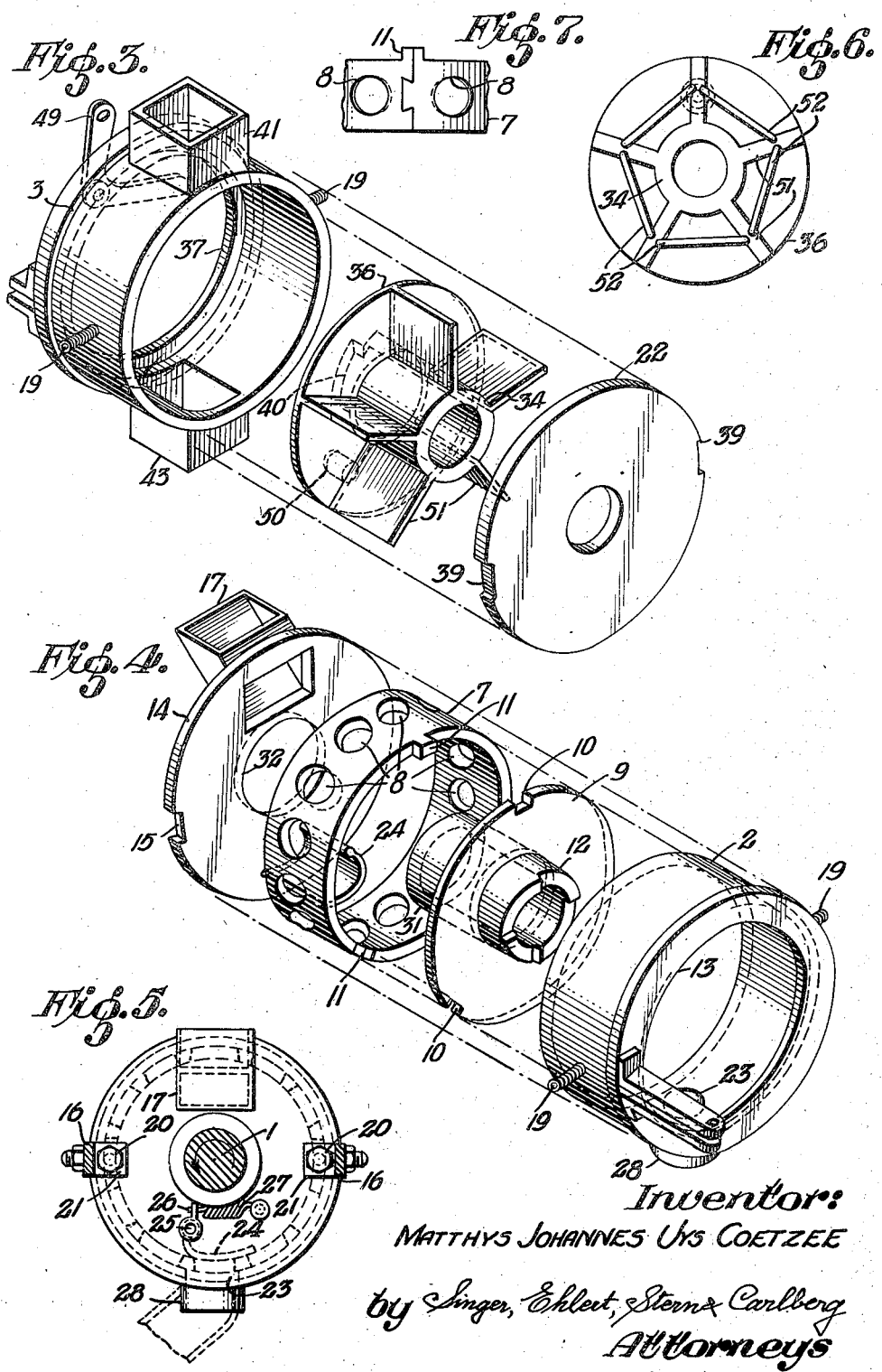

Patented July 29, 1947

2,424,742

UNITED STATES PATENT OFFICE 2,424,742

ROTARY PLANTER

Matthys Johannes Uys Coetzee, Nigel, Transvaal, Union of South Africa

Application July 22, 1944, Serial No. 546,132
In the Union of South Africa August 19, 1943

4 Claims. (Cl. 111—78)

This invention relates to improvements in planters of the wheeled type as used in agricultural operations for planting the seeds of crops in spaced parallel rows across a field over which the implement is drawn by animal or mechanical draft means.

In one of the most widely used types of planters for this purpose, the seed ejecting means consists of a perforated disc-like seed plate rotatably mounted in the bottom of a seed container placed forwardly of the land wheel axle, from which rotary motion is transmitted to said seed plate through a chain drive and bevel gearing. Similar power transmission means is used for operating a fertilizer discharging device mounted alongside the seed container. Both seed and fertilizer are led to a seed furrow, made by a forwardly fixed furrow opening share, by suitable guide chute means, the said furrow being closed by a land wheel suitably shaped for the purpose.

The main object of the invention is to provide a simplified planter implement in which the aforementioned chain drive and bevel gear mechanism for driving both the seed ejecting and fertilizer distributing means, is eliminated.

According to the invention the seed ejecting and fertilizer discharging means of a planter of the general type referred to, consists of separate seed and fertilizer feed controlling members each of which is arranged for rotary motion within a stationary casing having at least one upper inlet aperture communicating with a hopper-like container, and at least one bottom discharge aperture communicating with a guide chute leading to a seed furrow opened by a forwardly placed furrow-opening share, and in which both the said casings and the rotary feed controlling members are mounted on a land wheel axle, from which axle rotary motion is adapted to be transmitted directly to said feed controlling members.

The said casings are cylindrical in shape and are mounted co-axially with respect to said land wheel axle, the wheel or wheels mounted thereon being arranged to act additionally in known manner as seed furrow closing means.

Rotary motion from the land wheel axle is arranged to be transmitted to the feed controlling members as and when required, by clutching members slidably mounted on said axle and arranged to be actuated by manually operated control means. Preferably the said clutching members are spring-pressed towards their operative positions.

The feed controlling member for the seed consists of an annular collar-like seed ring provided with a plurality of spaced seed apertures, which, on rotation thereof, coincide in turn with a seed discharging aperture in the bottom side of the casing in which said seed ring is rotatably mounted, and wherein the seed is fed to the interior of said seed ring.

The feed controlling member for the fertilizer consists of a vaned rotor so arranged that the pockets formed between any two adjacent vanes are filled in turn as they pass beneath the top inlet aperture of the casing, while their contents are discharged as they pass in turn over the bottom discharge aperture of the casing.

To enable the invention to be more clearly understood and carried into practice; reference is now made to the accompanying drawings, in which like references denote like parts throughout the several views.

In the drawings:

Fig. 1 is a fragmentary perspective view of one side of a double-row planter constructed according to the invention.

Fig. 2 is a similar view showing the seed and fertilizer casings only, but drawn to a larger scale.

Fig. 3 is a perspective exploded view of the fertilizer casing and its associated parts.

Fig. 4 is a perspective exploded view showing the seed casing and its associated parts.

Fig. 5 is an end elevation of the seed casing and

Fig. 6 is an end elevation of the fertilizer feed controlling rotor showing method of varying the rate of distribution.

Fig. 7 is a fragmentary view of joint in said ring.

Referring to the drawings, reference 1 denotes one half of the axle of a double-row planter, on which axle are mounted the seed casing 2 and the fertilizer casing 3, one on either side of the axle bearing 4 fixed to the chassis frame 5. The planter is supported on two land wheels 6 of known construction at least one of which is keyed to the axle 1 so as to cause rotation thereof when the implement is drawn across the field.

The feed controlling member for the seed consists of the annular collar-like seed ring 7 (see Fig. 4) provided with a plurality of seed holes 8, and rotatably mounted within the seed casing 2. For transmitting rotary motion from the axle 1 to said seed ring 7, the clutch plate 9 is provided, in the peripheral recesses 10 of which the projections 11 of the seed ring 7 are adapted to engage when these parts are assembled within the casing 2. This clutch plate 9 is provided with a suitably notched clutch boss 12 and acts additionally as closing means for the end of the casing 2, which is provided with an inwardly directed locating flange 13. The opposite open end of said casing 2 is closed by the fixed end plate 14, the recesses 15 in which engage with the locating bars 16 as shown in Fig. 2, for securing purposes. This end plate 14 is provided with a seed inlet connection 17 with which the bottom end of the seed container 18 communicates as shown in Fig. 1. The locating bars 16 are secured to the casings 2 and 3 by means of the studs 19 while set screws 20 passing through inwardly bent lugs 21, provide the means for fixing the end plate 14 of the casing 2 and an end plate 22 of the casing 3.

To regulate the delivery of seeds through the holes 8 in the seed ring 7 and their passage in succession through the bottom seed discharging opening 23 in the casing 2, and to prevent wastage in the event of the seed ring 7 being stopped with one of its holes 8 in coincidence with said opening 23, a pivoted spring-pressed feed control flap 24 is adapted to form a closure for each hole 8 as it registers with said opening. This flap is pivotally mounted by a pin 25 passing through the fixed end plate 14 as shown in Figs. 4 and 5. By means of an arm 26 and a small tension spring 27, the said flap is normally held in resilient spring-pressed contact with the inside surface of the seed ring 7 as it rotates in the direction indicated by the arrow in Fig. 5. The seed discharging opening 23 communicates with a discharge connection 28 adapted to be connected to a chute, spout or duct 29 leading to a known type of furrow-opening share 30 as shown in Fig. 1. The clutch plate 9 is provided with an inwardly extending boss 31 which engages rotatably in a hole 32 in the end plate 14, and thereby steadies the clutch plate 9 when it is being rotated.

The fertilizer feed controlling member consists of the vaned rotor 34 which is rotatably mounted within the casing 3 by reason of the axle shaft 1 passing through the boss thereof. One end of said rotor 34 is shrouded as shown by an end disc 36 formed integrally therewith, which disc, by bearing against the inwardly directed flange 37 of the casing 3, forms one end closure therefor. The other end closure for the casing 3 consists of the end plate 22 held in place by the locating bars 16 engaging in the recesses 39 therein and by the setscrews 20 bearing thereagainst as shown in Fig. 2. One end of the boss of the rotor 34 projects beyond the end disc 36 and is there suitably notched to constitute a clutch component 40. The top inlet aperture of the casing 3 is provided with a connection 41 by which it communicates with the fertilizer container 42. The bottom discharge opening communicates by way of the connection 43 with a chute, spout or duct 44 leading to the share 30.

To prevent choking of the top fertilizer inlet opening to the casing 3 due to lumpiness or dampness of the fertilizer, a small ramming rod 45 is arranged to be reciprocated vertically above and in line with said opening.

This ramming rod 45 is bent outwardly at its top end and projects through a slot in the side wall of the container 42 where it fits, by means of its boss 46, on to a vertical rod 47 which is slidably mounted in a bracket 48 and is operated by the bell crank lever 49 which in turn is actuated by the pin 50 projecting crank-fashion from the end disc 36, as clearly shown in Fig. 2. For varying the rate of fertilizer feed, the vanes 51 of the rotor 34 may be slotted as shown in Fig. 6, to receive blanking off plates 52. Alternatively, arrangements may be made for fixing solid filling pieces between two adjacent vanes for the purpose of reducing the capacity of the pockets defined by said vanes.

The two casings 2 and 3 are supported from the chassis frame 5 by means such as by the vertical stays 53 which are bolted to the locating bars 16. Each of the clutch components 12 and 40 is adapted to co-act for engaging purposes with the flanged clutch sleeves 54 which are feather-keyed to the axle 1 and are pressed towards their engaging positions by the compression springs 55. Withdrawal of the clutch sleeves 54 is effected by means of the pivotally mounted forked clutch levers 56, the ends of which are pivotally connected to an operating link member 57 to which motion is imparted for clutch operating purposes by a suitably arranged hand lever not shown. Coiled compression springs 58, threaded over the studs 19 bear against the said clutch levers 56 and press them towards their "off" positions as clearly shown in Fig. 2.

In operation the seed to be sown is fed by way of the container 18 and inlet connection 17 into the interior of the seed ring 7. The seeds then drop into the seed holes 8 and as the ring 7 rotates, said seeds are carried past the control flap 24 until they drop through the seed opening 23 in the bottom of the casing 2, and thence by way of the chute or duct 29, into the rear part of the share 30. At the same time fertilizer entering the casing 3 by way of the connection 41, pours into the pockets formed between two adjacent vanes 51 as they pass beneath the inlet opening, and thereafter is discharged as said pockets register with the bottom opening and connection 43, whence the fertilizer is led by the chute or duct 44 to the rear part of said share 30 where it mixes with the seed as it is deposited in the seed furrow. Seed rings 7 having holes 8 of different sizes will be used for different seeds. The planting mechanism is so constructed that the interchange of parts is made easy. To facilitate changing of the seed ring 7, it is split so as to permit of its being passed over the axle 1 without having to dismantle it from its mountings, as shown in Fig. 7.

The seed and fertilizer containers 18 and 42 are supported from the frame 5 in any convenient manner.

What I claim is:

1. In an apparatus of the character described, the combination of a vehicle having wheels and a rotary axle for the same, a cylindrical container for granular material, the cylinder having an open end and a discharge opening at its circumference, a rotary dispenser for granular material in the container provided with a circular disc and positioned with said disc against the open end of the container to close the same, a hub for said rotary dispenser loosely seated on the rotary axle, and means for drivingly connecting the hub with the axle.

2. In an apparatus of the character described, the combination of a vehicle having wheels and a rotary axle for the same, a cylindrical container for granular material, the cylinder having an open end and a discharge opening at its circumference, a dispenser in the form of a tubular cylinder seated within said container, said cylinder being open at both ends, a circular disc attachable to one of the open ends of the tubular cylinder and adapted to be positioned against the open end of the container to form a closure for the same, a clutch for the disc, and means for connecting the clutch with the rotary axle of the vehicle.

3. In an apparatus of the character described, the combination of a vehicle having wheels and a rotary axle for the same, a cylindrical container for granular material, the cylinder having an open end and a discharge opening at its circumference, a dispenser in the form of a cylindrical drum in the interior of said container, a circular disc with which said drum is connectable, said circular disc being loosely mounted on the vehicle axle, the cylindrical dispenser having a plurality of openings circumferentially distributed, and means for directly driving said circular disc and cylindrical dispenser from the rotary axle of the vehicle.

4. In an apparatus of the character described, the combination of a vehicle having wheels and a rotary axle, a cylindrical container open at one end and having a discharge opening in its circumference, a dispenser drum in the interior of said container, said drum having a plurality of openings in its circumferfential wall, a circular disc connectable with one end of the drum and adapted to form an end closure for the container when the dispenser is operatively disposed within the container, a hub associated with the circular disc for the dispenser and loosely mounted on the rotary axle of the vehicle, means in the interior of the container for obstructing the path of granular material from the interior of the container directly through any of the openings in the dispenser and the discharge opening of the container, and means for drivingly connecting the hub of the circular disc with the rotary axle of the vehicle.

MATTHYS JOHANNES UYS COETZEE.

REFERENCES CITED

The following references are of record in the file of this patent:

UNITED STATES PATENTS

| Number | Name | Date |
|---|---|---|
| 1,161,369 | Ayers | Nov. 23, 1915 |
| 684,684 | Garrison | Oct. 15, 1901 |
| 711,996 | Moore | Oct. 28, 1902 |
| 213,995 | Markoe | Apr. 8, 1879 |